United States Patent [19]

Cookson

[11] 4,234,006
[45] Nov. 18, 1980

[54] METHOD OF FORMING AN OPENING IN THE OUTER ENCLOSURE OF A GAS-INSULATED ELECTRICAL APPARATUS

[75] Inventor: Alan H. Cookson, Churchill, Pa.

[73] Assignee: Westinghouse Electric Corp., Pittsburgh, Pa.

[21] Appl. No.: 2,631

[22] Filed: Jan. 11, 1979

[51] Int. Cl.³ .................. B23B 41/08; F16L 41/04; H01B 9/06
[52] U.S. Cl. ................... 137/15; 29/157 R; 29/428; 73/432 R; 137/318; 137/323; 138/92; 174/11 R; 225/2; 225/96; 408/1 R; 408/72 R; 408/110
[58] Field of Search ............ 174/11 R, 11 BH, 14 R, 174/22 C; 29/428, 456, 593, 624; 137/15, 317, 318, 320, 323; 138/92, 94, 104; 73/432 R; 408/1 R, 14, 72 R, 110; 225/2, 96; 30/410

[56] References Cited

U.S. PATENT DOCUMENTS

| 24,949 | 8/1859 | Myers et al. | 137/15 |
| 790,735 | 5/1905 | Martin | 225/2 X |
| 1,181,910 | 5/1916 | McGilvray | 137/317 X |
| 1,935,902 | 11/1933 | Brant | 137/317 X |
| 2,805,273 | 9/1957 | Cuthbert | 137/317 X |
| 3,576,195 | 4/1971 | Richard, Jr. | 137/318 X |
| 3,905,388 | 9/1975 | Chiarelli | 137/318 |
| 3,983,756 | 10/1976 | Danguillier et al. | 73/432 R |
| 4,096,754 | 6/1978 | Beveridge, Jr. et al. | 73/432 R |

FOREIGN PATENT DOCUMENTS 2165284 7/1973 Fed. Rep. of Germany ........ 174/11 R

Primary Examiner—Laramie E. Askin
Attorney, Agent, or Firm—M. S. Yatsko

[57] ABSTRACT

Electrical apparatus includes an outer enclosure, an electrode within the enclosure, and an insulating gas electrically insulating the electrode from the enclosure. A support plate is secured to the outer enclosure, and the support plate has an opening therein. A housing, containing valve means, is secured to the support plate adjacent the support plate opening. An end plate is secured to the end of the housing. The valve means in the housing are capable of being in two positions, a first position preventing the flow of gas past said valve means, and a second position wherein an opening which is through the valve means is aligned with the support plate opening.

An opening is formed through the enclosure in the wall portion thereof which is in alignment with the support plate opening. The opening through the enclosure is formed without generating contamination particles within the enclosure and in a manner which minimizes escape of gas from the enclosure. Specifically, a pulling rod is welded to the outer wall of the enclosure, the support plate and valve means are secured to the enclosure with the pulling rod extending therethrough, a hollow tube having cutting means at the end thereof is positioned around the pulling rod, the cutting means is operated to effect only a partial cutting of the enclosure wall, and then a force is applied to the pulling rod to break out the portion of the enclosure wall partially cut by the cutting means. Thereafter, the pulling rod and cutting means are removed and the valve means is closed.

2 Claims, 8 Drawing Figures

METHOD OF FORMING AN OPENING IN THE OUTER ENCLOSURE OF A GAS-INSULATED ELECTRICAL APPARATUS

BACKGROUND OF THE INVENTION

This invention relates generally to gas-insulated electrical apparatus, and more particularly to gas-insulated electrical apparatus including provisions for inserting monitoring or inspection members into the interior of the apparatus without introducing contamination particles or permitting the escape of the insulating gas.

Gas-insulated electrical apparatus typically comprises an outer enclosure, or sheath, at low or grounded electrical potential, and an electrode disposed within the enclosure at high potential with respect to the enclosure. The electrode may, for example, be at system voltages ranging from 138 KV to 1100 KV. An electrically insulating gas, typical of which is sulfur hexafluoride or mixtures containing sulfur hexafluoride, is disposed within the enclosure and electrically insulates the inner-disposed electrode from the outer enclosure.

The above-described electrical apparatus is typically elements either in a gas-insulated substation or is a transmission line. When a fault occurs in either the substation or the transmission line, there are circumstances where it may be desirable to have the ability to make an inspection of the faulted area to evaluate the damage and decide whether the section needs to be replaced or repaired, or whether it has the ability to be connected back into electrical service. To do this in an efficient manner, it may be desirable to have an optical inspection system which allows a visual observation device to be inserted through the outer electrode, or sheath, without removing the insulating gas, and after the inspection be able to seal the inspection hole with a gas-tight fitting. The inspection system should preferably not introduce deleterious contamination particles into the equipment during any of the cutting, inspecting, or sealing operations.

SUMMARY OF THE INVENTION

An improved gas-insulated electrical apparatus is provided by this invention which includes an enclosure at low potential, an electrode at high potential with respect to the enclosure disposed within the enclosure, and an insulating gas which electrically insulates the high-voltage electrode from the outer enclosure. A support plate is secured to the enclosure, with the support plate having an opening therethrough. Sealing apparatus, comprising a tubular housing and a movable valve means is secured to the support plate, with the housing being removably secured to the support plate and containing therein the movable valve means. The valve means has an opening therethrough, and the valve means are capable of being in two positions: a first position preventing a flow of gas past the valve means in said housing; and a second position having said valve means opening aligned with the support plate opening. An end plate may be removably secured to the end of the housing.

An opening is formed through the enclosure in the wall portion thereof which is in alignment with the support plate opening. The opening through the enclosure is formed without generating contamination particles within the enclosure and in a manner which minimizes escape of gas from the enclosure. Specifically, a pulling rod is welded to the outer well of the enclosure, the support plate and valve means are secured to the enclosure with the pulling rod extending therethrough, a hollow tube having cutting means at the end thereof is positioned around the pulling rod, the cutting means is operated to effect only a partial cutting of the enclosure wall, and then a force is applied to the pulling rod to break out the portion of the enclosure wall partially cut by the cutting means. Thereafter, the pulling rod and cutting means are removed and the valve means is closed.

BRIEF DESCRIPTION OF THE DRAWINGS

Reference is now made to the description of the preferred embodiment, illustrated in the accompanying drawings, in which.

DESCRIPTION OF THE PREFERRED EMBODIMENTS

Figure 1:
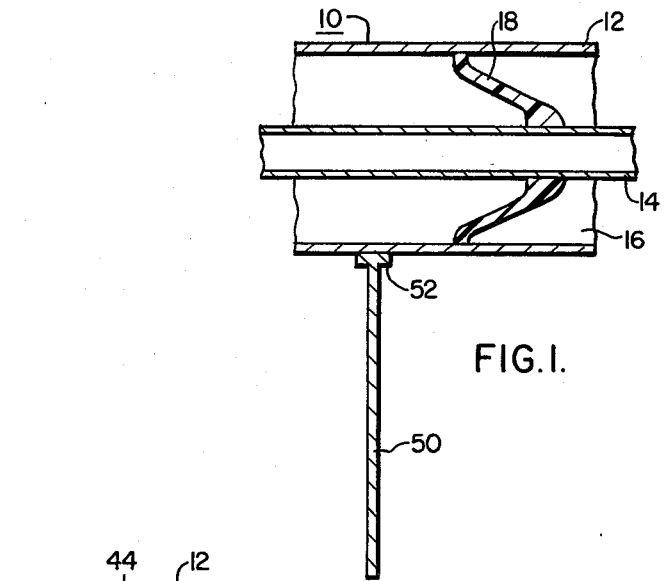
FIG. 1 is a sectional view of the gas-insulated electrical apparatus during the first step of forming an opening in the outer enclosure.

Referring now to FIG. 1, therein is illustrated a gas-insulated transmission line 10 which is typical of the electrical apparatus of this invention. The transmission line 10 is comprised of an aluminum outer enclosure or sheath 12, and an inner electrode 14 disposed within the outer enclosure 12. The inner electrode 14 and the outer enclosure 12 are typically of a good electrically conducting material such as aluminum. The inner electrode 14 would typically be at high potential with respect to the outer enclosure 12, with the inner electrode 14 typically being at, say, $138/\sqrt{3}$ KV–$1100/\sqrt{3}$ KV and the outer enclosure 12 being at low or ground potential. An insulating gas 16, typical of which is sulfur hexafluoride or mixtures containing sulfur hexafluoride, is disposed within the outer enclosure 12 and functions to electrically insulate the inner electrode 14 from the outer enclosure 12. If needed, insulating support means 18 may be utilized for insulatably supporting the inner electrode 14 within the outer enclosure 12. However, on short lengths of line, which may be, for example, within a gas-insulated substation, the insulating support means 18 may not be needed.

Because in rare instances faults may occur within the electrical apparatus 10, it may be desirable to provide a way of inspecting the interior of the outer enclosure 12 to determine the magnitude and extent of any fault-related damage. For example, in gas-insulated transmission lines, it may be desirable to provide a way of optically inspecting insulators, such as the insulators 18, to determine whether arcing across their surfaces has damaged them sufficiently that the transmission line cannot continue in service. To accomplish this, the method and apparatus of this invention may be utilized.

Figure 2:
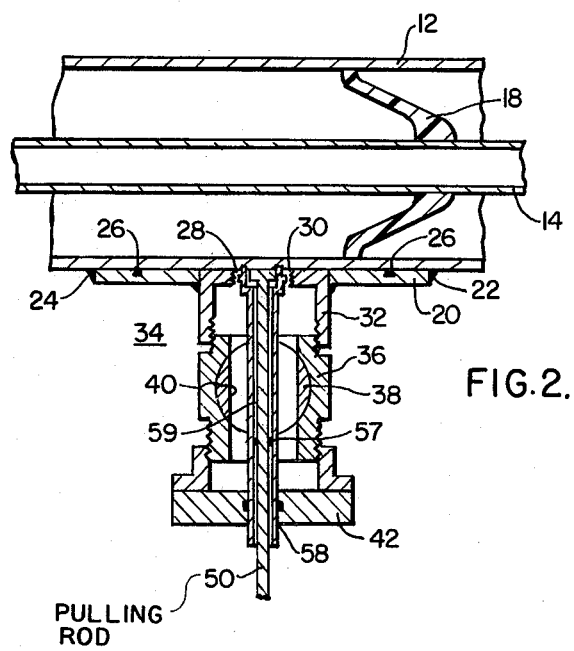
FIG. 2 is a sectional view of the electrical apparatus according to the teachings of the invention, having secured thereto apparatus for forming the opening in the enclosure and for minimizing the loss of insulating gas.
Figure 4:
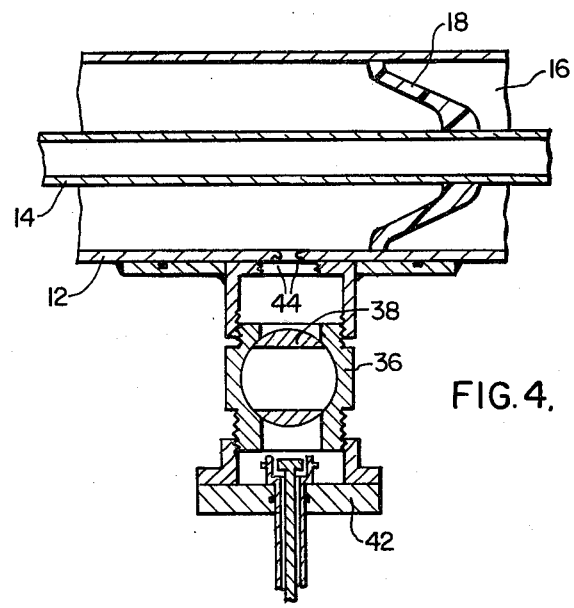
FIG. 4 is a sectional view illustrating a further step in the opening-forming sequence.
Figure 6:
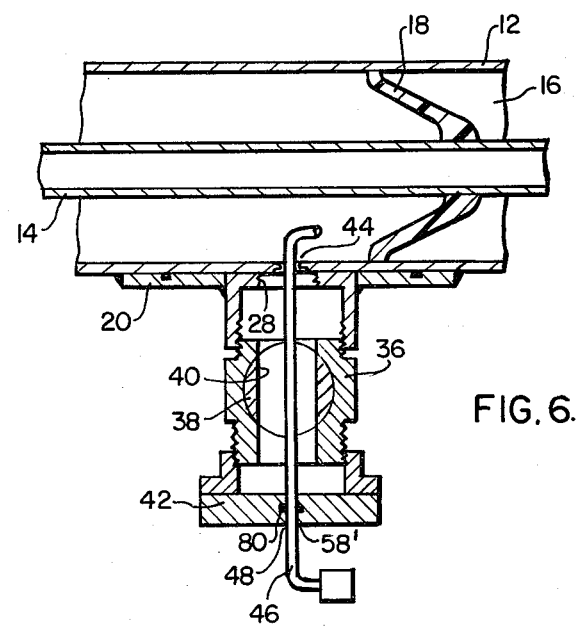
FIG. 6 is a sectional view illustrating the insertion of the optical inspection device into the interior of the electrical apparatus.

Referring now to FIGS. 2, 4 and 6, therein is illustrated electrical apparatus which includes auxiliary apparatus which permits the insertion of such inspection members into the interior of the outer enclosure 12. As illustrated, a support plate 20 is secured, by means such as the welds 22, 24, to the outer enclosure 12, preferably at the lowermost portion thereof. Seals 26 may be utilized between the support plate 20 and the outer enclosure 12 to prevent the migration of contamination particles, such as from the welds 22, 24, to adjacent the outer enclosure 12. The support plate 20 has an opening 28 therein, with a screw thread 30 disposed about the opening, whose function will hereinafter be described. The support plate 20 has, preferably, a tubular extension 32 extending outwardly therefrom, with the support plate opening 28 being disposed within the area bounded by the tubular extension 32. Although illustrated as a separate member secured to the support plate 20, the support plate 20 and the tubular extension 32 may be formed as an integral member.

Secured to the tubular extension 32 is sealing apparatus 34 which permits the insertion of members into the interior of the outer enclosure 12 in a manner which will hereinafter be explained, and which minimizes the escape of insulating gas 16 from within the enclosure 12. The sealing apparatus 34 comprises a tubular housing 36 which is removably secured to the tubular extension 32. Disposed within the tubular housing 36 are movable valve means 38, preferably a rotatable ball valve. The ball valve 38 has an opening 40 extending therethrough. The ball valve 38 is capable of being in at least two positions; a first position, as illustrated in FIG. 2, where the ball valve opening 40 is aligned with the interior of the tubular extension 32 and the support plate opening 28; and a second position, illustrated in FIG. 4, where the ball valve 38 prevents the flow of gas past the ball valve 38 and the housing 36. Thus, when the ball valve 38 is in the position illustrated in FIG. 4, gas which may be present within the outer enclosure 12 and escaping through an opening formed within the outer enclosure 12 cannot flow past the ball valve 38, thereby minimizing the loss of gas. An end plate 42 is removably secured to the end of the housing 36. As shown in FIGS. 4 and 6, an opening 44 may be formed in the outer enclosure 12, adjacent the opening 28 in the support plate 20, and an insertion member 46 may be inserted within the interior of the outer enclosure 12. The insertion member 46, which is utilized with the ball valve 38 being in the position illustrated in FIGS. 2 and 6, extends through an opening 48 in the end plate 42, through the opening 40 in the ball valve 38, through the opening 28 in the support plate 20, and through the opening 44 in the outer enclosure 12 to the interior of the enclosure 12. For optical inspection, it is preferred that the insertion member 46 be a self-illuminated fiber-optic viewer. Also, if contamination particles are present within the outer enclosure 12, such as may be caused by the fault, it may be desirable to remove such contamination particles. This may be accomplished by utilizing a suction device as the insertion member 46, which may then vacuum up the contamination particles.

The auxiliary apparatus illustrated in the drawings is also useful for forming the opening 44 in the outer enclosure 12. Referring to FIGS. 1–5 sequentially, therein is illustrated one method of forming the opening 44 in the outer enclosure 12 without generating contamination particles within the outer enclosure 12, and minimizing the loss of insulating gas 16 from within the enclosure 12. As one skilled in the art can readily realize, certain of the steps can be performed in different sequences, and the following sequence of steps is the preferred embodiment, although other sequences are possible.

Initially, a pulling rod 50, having a shoulder section 52 thereon, is fixably secured to the outer enclosure 12 at the location where the opening is desired. This pulling rod 50 is preferably welded to the outer enclosure 12. Then, as illustrated in FIG. 2, the support plate 20 is welded to the outer enclosure 12, with the pulling rod 50 extending through the support plate opening 28. The tubular housing 36 is then removably secured, such as by screwing, to the tubular extension 32 of the support plate 20. As previously described, the tubular housing 36 has disposed therein the rotatable ball valve 38. Next, an elongated hollow tube 54, having sawteeth 56 at one end thereof (see FIG. 3), is inserted through the opening 58 in the end plate 42. The hollow tube 54 preferably has a load bearing surface 60 sized with the shoulder 52 on the pulling rod 50, and also has outward extensions 62 spaced a predetermined distance from the end 64 of the sawteeth 56, which function will hereinafter be described. Additionally, if desired, the extension 62 may be of a size larger than the opening 58 in the end plate 42, so that the hollow tube 54 cannot be pulled outwardly from the end plate 52. Alternatively, the opening 58 may be sized larger than the extensions 62.

The end plate 42 is then removably secured to the end of the tubular housing 36, with the pulling rod 50 extending through the end plate opening 58 and extending within the interior of the hollow tube 54 with gas-tight seals 57 sealing the gap 59 between the rod 50 and the tube 54. The hollow tube is then moved upwardly through the ball valve opening 40, the interior of the tubular extension 32, and the support plate opening 28 to a position against the outer enclosure 12. The hollow tube 54 is then rotated, by means now shown, so as to provide a cutting action into the metallic outer enclosure 12. This cutting action is facilitated by the bearings 70 which space the hollow tube 54 from the pulling rod 50. The cutting into the outer enclosure 12 continues preferably only to a predetermined depth. The outward extension 62 on the hollow rod 54 may be utilized to determine when the predetermined depth has been achieved. Thus, the rotation of the hollow tube 54, having its sawteeth 56 at the end thereof, accomplishes a cutting through to a depth less than the depth of the outer enclosure 12. The pulling rod 50 is then pulled by suitable means, such as a hydraulic mechanism (not shown), to remove the sheath 12 material cut by the sawteeth 56. Because the sawteeth 56 did not extend through the entire depth of the outer enclosure 12, no particles were generated within the outer enclosure 12, and sharp edges of the opening 44 were avoided.

Figure 5:
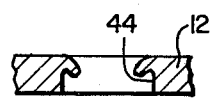
FIG. 5 is a detailed view of the opening formed in the outer enclosure.

FIG. 5 illustrates a detailed view of the opening 44 formed in the outer sheath 12. As can be seen, the final pulling on the pull rod 50 has formed an opening without sharp edges on the interior of the outer enclosure 12.

Figure 3:
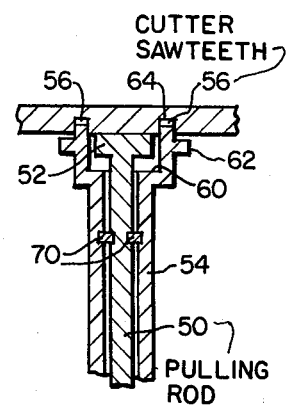
FIG. 3 is a detailed, sectional view of the opening-forming operation.

As can be appreciated from FIGS. 2 and 3, as the pulling rod 50 is pulled, the shoulder 52 engages the bearing surface 60 of the hollow tube 54, thereby also moving the hollow tube 54 downwardly away from the outer enclosure 12. The outward extension 62, larger than the opening 58 in the end plate 42, stops the outward movement of both the pulling rod 50 and the hollow tube 54 in the position illustrated in FIG. 4. Once this position is achieved, the ball valve 38 is rotated to its second position where it prevents the escape of insulating gas 16, and thus the opening 44 has been formed in the outer enclosure 12, and the insulating gas 16 is prevented from escaping from the system.

After the apparatus is in the position illustrated in FIG. 4, with the ball valve 38 rotated to prevent the escape of insulating gas, the end plate 42 can then be removed, and the pulling rod and hollow tube 54 removed. The end plate 42 or a similar end plate with a smaller diameter opening 58', is then secured to the end of the housing 36. An insertion member 46 is then inserted through the end plate opening 58', with the seals 80 functioning to prevent the escape of any insulating gas. The ball valve 38 is then rotated to its position wherein the opening 40 is aligned with the end plate opening 58', and the insertion member is moved upwardly through the ball valve opening 40, the tubular extension 32, the support plate opening 28 and the enclosure opening 44 to within the interior of the outer enclosure 12. Inspection of the system, removal of contamination particles, or monitoring of the equipment can then proceed as desired.

After, for example, the system has been inspected, the insertion member 46 is then removed, and the ball valve 38 rotated to its second position prohibiting the flow of insulating gas past the housing 36. The end plate 42 can then be removed, and, if desired, the system can be temporarily or permanently sealed. This sealing is illustrated in FIGS. 7 and 8.

Figure 7:
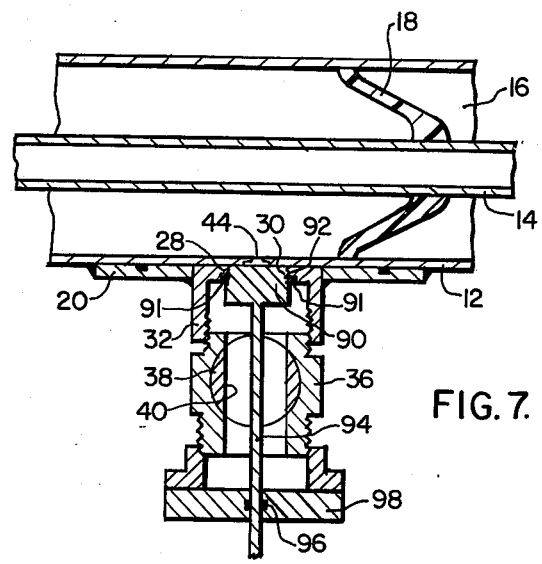
FIG. 7 is a sectional view illustrating the further step of sealing the opening formed in the outer enclosure.
Figure 8:
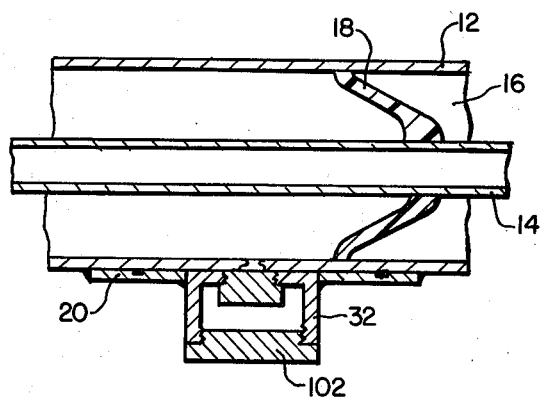
FIG. 8 is a sectional view illustrating the electrical apparatus with the opening being permanently sealed.

As shown in FIG. 7, a sealing plug 90 having a thread 92 around the outer periphery thereof, is attached to a plug shaft 94, which shaft is then inserted through an opening 96 in the end plate 98. The end plate 98 is then secured to the end of the housing 36. The ball valve 38 is rotated so that the ball valve opening 40 is aligned with the end plate opening 96, and the shaft 94 and the sealing plug 90 are moved upwardly through the ball valve opening 40 and the tubular extension 32 to the support plate opening 28, where the sealing plug 90 is screwed into the support plate opening 28, engaging the threads 30 around the periphery thereof and compressing against the seal 91. This then provides a seal against the escape of insulating gas 16 from within the interior of the outer enclosure 12 through the opening 44. The ball valve housing 36 is then removed, such as by unscrewing, from the tubular extension 32, and the shaft 96 is removed from the sealing plug 90. Thus, the ball valve can then be reused at other desired locations. Then, if desired, as illustrated in FIG. 8, an end plate 102 is sealingly secured to the tubular extension 32 by means such as screwing or, if a permanent seal is desired, by welding.

Thus, as can be seen, this invention enables gas-insulated electrical apparatus to be optically inspected without the need for de-pressurization. Insulators, conductors, and even mechanisms could be inspected to determine if there is sufficient damage to warrant extensive repairs or if the system can remain in service. For long length gas-insulated transmission line systems or complex gas-insulated substation systems, the inspection system can be utilized to confirm that a faulted section has been located. The system can also be modified to other uses on gas-insulated electrical apparatus, such as mounting temporary or permanent probes for monitors. Additionally, by utilizing suitable mechanical probes as the insertion member, it may be possible to make simple repairs on fully pressurized gas-insulated systems such as, for example, to repair bent stress shields, or remove contamination.

I claim as my invention:

1. A method for forming an opening in a gas-containing metal enclosure which minimizes the escape of gas comprising the steps of:

fixedly securing a pulling rod to the enclosure at the location of the desired opening;

fixedly securing a support plate having an opening therethrough to said enclosure such that said pulling rod extends through said support plate opening;

securing a movable valve means-containing housing to said support plate adjacent said support plate opening, said movable valve means having an opening therethrough and capable of being in a first position preventing a flow of gas past said valve means and said housing and a second position with said valve means opening being aligned with said support plate opening, said valve means being in said second position with said pulling rod extending through said valve means opening;

securing an end plate having an opening therethrough aligned with said valve means opening when said valve means is in said second position to said housing, said pulling rod extending through said end plate opening;

inserting an elongated hollow tube having sawteeth at one end thereof through said end plate opening, said valve means opening, and said support plate opening to contact said sawteeth against said metal enclosure, said pulling rod being disposed within said tube;

rotating said tube such that said sawteeth cut into said enclosure;

pulling said pulling rod and said tube to remove the metal material cut out from said enclosure;

withdrawing said pulling rod and said tube from said support plate opening and said valve means opening; and rotating said valve means to said first position.

2. The method according to claim 1 wherein said metal enclosure has a wall thickness, and said step of rotating said tube includes rotating said tube such that said sawteeth cut into said enclosure a depth less than said enclosure wall thickness.

* * * * *